United States Patent [19]
Kudo et al.

[11] Patent Number: 5,800,839
[45] Date of Patent: Sep. 1, 1998

[54] PLASTIC MAGNET INJECTION MOLDING MACHINE

[75] Inventors: Yoshiaki Kudo; Haruo Okada; Fumihiko Kobayashi, all of Hanishina-gun, Japan

[73] Assignee: Nissei Plastic Industrial Co., Ltd., Nagano-ken, Japan

[21] Appl. No.: 802,933

[22] Filed: Feb. 21, 1997

Related U.S. Application Data

[63] Continuation of Ser. No. 385,751, Feb. 8, 1995, abandoned.
[51] Int. Cl.$^6$ ................................................. B29C 33/32
[52] U.S. Cl. ........................... 425/3; 264/24; 264/108; 264/DIG. 58; 425/174; 425/174.6; 425/174.8 R; 425/DIG. 33
[58] Field of Search ........................ 425/3, DIG. 33, 425/174, 174.6, 174.8 R; 264/24, 108, DIG. 58

[56] References Cited

U.S. PATENT DOCUMENTS 4,661,053 4/1987 Yokota et al. ............................. 425/3

FOREIGN PATENT DOCUMENTS

| 59-143312 | 8/1984 | Japan . |
| 1221213 | 9/1989 | Japan . |
| 25527 | 2/1990 | Japan . |

OTHER PUBLICATIONS

Websters Ninth New Collegiate Dictionary, 1986 pp. 405, 875.

*Primary Examiner*—Tim Heitbrink
*Attorney, Agent, or Firm*—Weingarten, Schurgin, Gagnebin & Hayes LLP

[57] ABSTRACT

A plastic magnet injection molding machine comprising a pair of exciting coils respectively embedded into a fixed plate and a movable plate along with respective seats and a metal mold including ferromagnetic central members and non-magnetic peripheral members is provided. With such an arrangement, the machine can anisotropically process magnet powder with enhanced efficiency by energizing the coils. Both the fixed plate 2 and the movable plate 4 of the machine are made of ferromagnetic metal. The exciting coils 7, 8 are respectively embedded into the plates at the oppositely disposed sides thereof along with the non-magnetic annular seats 9, 10 surrounding the respective exciting coils. The fixed mold 12 and the movable mold 13 of the metal mold 11 of the machine include respective central members 14, 15 made of ferromagnetic metal. The central members 14, 15 of the fixed and movable molds are respectively made to abut corresponding central portions 2a, 4a of the fixed plate 2 and the movable plate 4. The fixed 12 and the movable mold 13 of the metal mold 11 also include respective peripheral members 16, 17 secured respectively to the annular seats 9, 10 to anchor the metal mold 11 to the plates.

2 Claims, 2 Drawing Sheets

PLASTIC MAGNET INJECTION MOLDING MACHINE

This application is a continuation of application Ser. No. 08/385,751, filed Feb. 8, 1995 now abandoned.

BACKGROUND OF THE INVENTION

1. Field of the Invention

This invention relates to an injection molding machine for molding plastic magnets of a mixture of magnetic powder and plastic resin.

2. Background Art

Conventional injection molding machines for molding plastic magnets normally comprises a removable metal mold, a fixed plate, a movable plate and magnetically exciting coils arranged on opposite lateral sides of the plates or along the periphery of the metal mold and provided with a non-magnetic cover. In known molding machines comprising exciting coils arranged on opposite lateral sides of the fixed and movable plates, the plates need to be separated from each other by a distance required to accommodate the exciting coils (as described in Japanese Utility Model Publication No. 2-5527).

On the other hand, molding machines comprising exciting coils arranged along the periphery of the metal mold require a large space where the exciting coils are moved each time the metal mold is removably fitted to the machine so that the fixed and movable plates have to be separated from each other to accommodate the space (as described in Japanese Patent Laid-Open Publication No.59-143312).

In any case, molding machines of the above identified type have the obstacle of the distance between the fixed and movable plates to be overcome for down-sizing. In an attempt to overcome the problem and provide a molding machine with a reduced distance separating the plates and an improved efficiency of excitation, the fixed and movable plates are made of non-magnetic metal and provided at the center thereof with respective magnetic core members and exciting coils arranged around the core members respectively within the fixed plate as disclosed in Japanese Patent Laid-Open Publication No. 1-221213.

While the above patent provides a remarkable technological achievement in that the distance separating the fixed and movable plates of a plastic magnet injection molding machine of the type under consideration is significantly reduced by arranging the exciting coils within the fixed plate, the latter comes to have a complicated profile and the machine itself is accompanied by an additional problem of heat generated by the exciting coils in operation.

In view of the above described circumstances, it is therefore an object of the invention to provide a plastic magnet injection molding machine, wherein the exciting coils are combined with respective seats and securely embedded into respective outer peripheral portions of the fixed and movable plates and the removable metal mold comprises a ferromagnetic central member and a non-magnetic peripheral member such that the machine is substantially free from the problem of heat if the exciting coils are arranged within the plates and that of leaking magnetic flux and has a relatively simple configuration and therefore the metal mold can easily be fitted thereto.

SUMMARY OF THE INVENTION

According to the invention, the above object is achieved by providing a plastic magnet injection molding machine comprising a fixed plate, a movable plate, tie bars for guiding the movable plate and coupling the fixed and movable plates, said fixed and movable plates and said tie bars being made of ferromagnetic metal, annular exciting coils embedded into respective outer peripheral portions of the plates, annular seats engagedly fitted to the outer periphery of the respective exciting coils and embedded with said coils into the respective outer peripheral portions of the plates, said annular seats being made of non-magnetic metal, and a metal mold including a fixed mold and a movable mold having respective central members made of ferromagnetic metal and respective peripheral members, said central members of the metal mold abutting respective central portions of the fixed and movable plates defined by said respective exciting coils such that the metal mold is secured to the fixed and movable plates by anchoring said peripheral members to the respective annular seats.

With the above described arrangement, the fixed and movable molds are tightly fastened to produce a cavity defined by the central members and the peripheral members thereof as the movable plate is moved forward. When the two exciting coils are energized, a closed magnetic path is formed through the central portion of the movable plate defined by the embedded annular exciting coil, the central member of the movable mold, the cavity, the central member of the fixed mold, the central portion of the fixed plate defined by the embedded annular exciting coil, the fixed plate, the tie bars and the movable plate to generate magnetic force that can anisotropically process the magnetic powder injected into the cavity with synthetic resin as an additive. Any leaky magnetic force that may appear on the outside of the exciting coils when they are energized is effectively trapped within the non-magnetic annular seats.

Now, the present invention will be described in greater detail by referring to the accompanying drawings that illustrates a preferred embodiment of the invention.

DETAILED DESCRIPTION OF THE PREFERRED EMBODIMENTS

Figure 1:
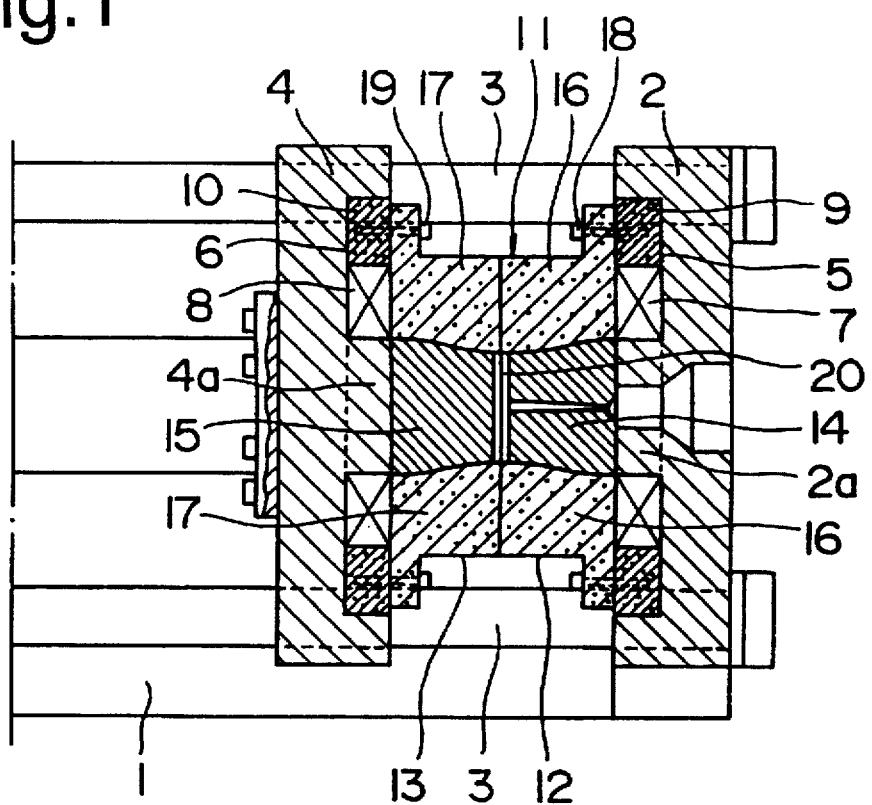
FIG. 1 is a schematic longitudinal sectional of a preferred embodiment of plastic magnet injection molding machine according to the invention, showing a principal portion thereof.
Figure 2:
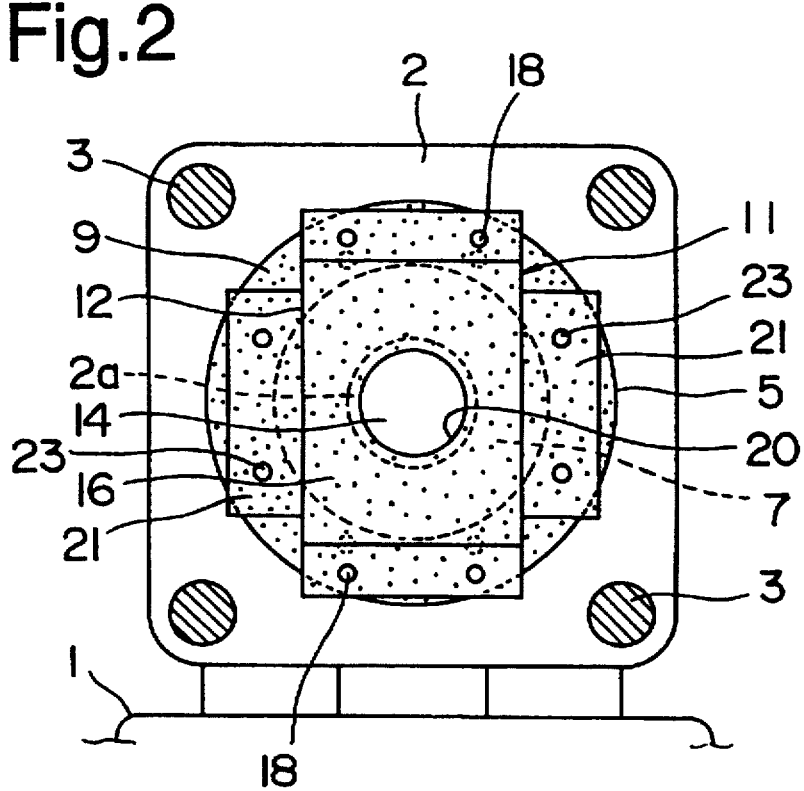
FIG. 2 a side view of the fixed plate of the embodiment of FIG. 1, showing the inside thereof.
Figure 3:
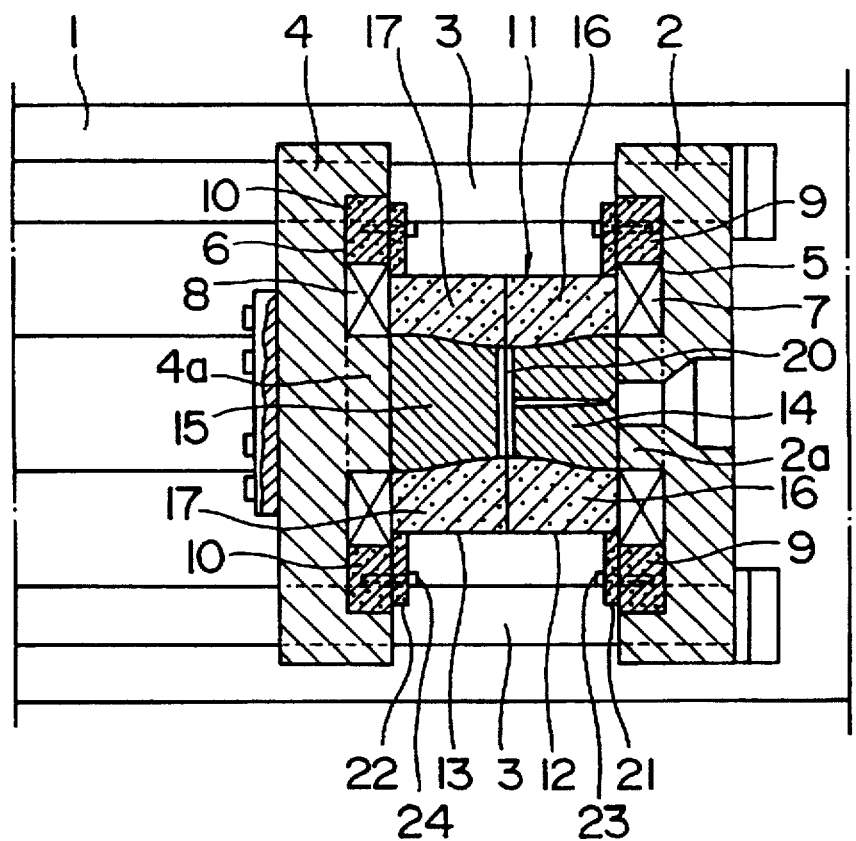
FIG. 3 is a schematic sectional plan view of the embodiment of FIG. 1, showing a principal portion thereof.

Referring to FIG. 1, a preferred embodiment of the invention comprises a machine platform 1, a fixed plate arranged on the machine platform for receiving a metal mold and provided with a pair of mold fastening cylinders (not shown) and a plurality of tie bars 3, 3 running through respective corners of the fixed plate and coupling the cylinders.

The embodiment further comprises a movable plate 4 having corners, through which the respective tie bars 3, 3 also run so that the movable plate 4 may be moved back and forth relative to the fixed plate 2. A mold fastening ram is arranged on the back of the movable plate 4. The movable plate 4, the fixed plate 2 and the tie bars 3, 3 are made of ferromagnetic metal.

Said fixed plate 2 and said movable plate 4 are provided at an outer peripheral portion with respective mutually aligned annular grooves 5, 6 where respective annular exciting coils 7, 8 and annular seats 9, 10 are embedded. The annular seats 9, 10 are made of non-magnetic metal and engagedly fitted to the respective exciting coils 7, 8. Additionally, the annular seats 9, 10 are secured to the respective plates with appropriate means (not shown) so that they may not be moved away from the plates by the load of the metal mold.

Reference numeral 11 generally denotes a metal mold that includes a fixed mold 12 and a movable mold 13 provided respectively with central members 14, 15 made of ferromagnetic metal and peripheral members 16, 17 made of non-magnetic metal. The central members 14, 15 of the fixed and movable molds 12, 13 of the metal mold 11 are made to abut corresponding the central portions 2a, 4a of the plates defined by the respective exciting coils 7, 8 while the peripheral members 16, 17 are rigidly and respectively secured to the corresponding annular seats 9, 10 of the fixed plate 2 and the movable plate 4 on the oppositely disposed sides thereof by means of bolts 18, 19 so that a cavity 20 is formed between the central members when the mold is closed.

Reference numerals 21 and 22 denote a pair of covers made of a non-magnetic materials such as bakelite designed to cover any exposed areas of the exciting coil 7 that may be produced on lateral sides of the metal mold 11 if the latter is small as they are secured to the respective annular seats 9, 10 by means of bolts 23, 24.

With the above described arrangement, the fixed and movable molds 12, 13 of the metal mold 11 are tightly fastened together as the movable plate 4 is moved forward until a cavity 20 is defined by the central members 14, 15 and the peripheral members 16, 17. A flux of magnetic force is generated as the exciting coils 7, 8 are energized under this condition.

The generated magnetic flux flows along a closed magnetic path running through the central portion 4a of the movable plate 4, the central member 15 of the movable mold, the central member 14 of the fixed mold, the central portion 2a of the fixed plate 2, the fixed plate 2, the tie bar 3 and the movable plate 4. Any leaky magnetic force that may appear on the outside of the exciting coils when they are energized is effectively trapped within the non-magnetic annular seats 9, 10.

When a material containing powder of a magnetic substance such as ferrite or a rare earth metal and synthetic resin as an additive is injected into the cavity 20 from an injector (not shown) to fill the cavity, the material is oriented along the direction of the magnetic flux to anisotropically process the magnetic powder and produce a molded product of plastic magnet.

While the peripheral members of the metal mold of the above embodiment are made of non-magnetic metal, they may alternatively be made of ferromagnetic metal like the central members if they are fitted to non-magnetic seats. In other words, the material of the peripheral members is not limited to non-magnetic metal.

Advantages of the Invention

As described above in detail, since a plastic magnet injection molding machine according to the invention comprises exciting coils are combined with respective annular seats and embedded into the fixed plate and the movable plate respectively, the loss of magnetic flux can be minimized if the plates are made of ferromagnetic metal so that the operation of anisotropically processing magnetic powder can be conducted efficiently.

Additionally, since the metal mold is secured to the annular seats arranged on the outside of the respective exciting coils, the entire operation of injection molding can be conducted efficiently with a reduced rate of power consumption if compared with a machine where the exciting coils are fitted to respective central holes of the fixed and movable plates where a closed magnetic path runs.

Still additionally, since the covers for possible exposed areas of the exciting coils can be made very thin, they are less liable to store heat and hence can prevent burnt exciting coils from occurring if compared with a machine where thick covers are arranged to shield the exciting coils and, at the same time, to take the role of seats for receiving the metal mold.

Finally, since the exciting coils are respectively secured to the fixed and movable plates simply by embedding them into the respective annular grooves arranged on the oppositely disposed surfaces of the fixed and movable plates along with the annular seats without requiring large covers, the overall configuration of the machine can be simplified and the metal mold can be removably fitted to the machine with ease.

What is claimed is:

1. A plastic magnet injection molding machine comprising a fixed plate, a movable plate, a plurality of tie bars for guiding the movable plate and coupling the fixed and movable plates, said fixed and movable plates and said plurality of tie bars being made of ferromagnetic metal, a plurality of annular exciting coils embedded into respective outer peripheral portions of the plates, annular seats engagedly fitted to the outer periphery of the exciting coils and embedded with said coils into the respective outer peripheral portions of the plates, said annular seats being made of non-magnetic metal, and a metal mold including a fixed mold and a movable mold having respective central members made of ferromagnetic metal and respective peripheral members made of non-magnetic metal, said central members of the metal mold abutting respective central portions of the fixed and movable plates defined by said exciting coils such that the metal mold is secured to the fixed and movable plates by anchoring said peripheral members to the respective annular seats, wherein a current flowing through one of said exciting coils produces a plurality of toroidal magnetic flux flow paths about said exciting coils, each of said paths consisting of one of said plurality of tie bars, said fixed mold central member, said movable mold central member, said movable plate, and said fixed plate.

2. The plastic magnet injection molding machine according to claim 1, further comprising respective covering members for covering exposed areas of said annular exciting coils after the mold is secured to said respective annular seats, said respective covering members being formed from a non-magnetic material; and wherein said peripheral members include a rectangular shape fitting within the outer diameter of said annular coils, and shoulder portions for securing said peripheral members to said respective annular seats.

* * * * *